US005258969A

United States Patent [19]

Refregier et al.

[11] Patent Number: 5,258,969

[45] Date of Patent: Nov. 2, 1993

[54] SIGNAL TO NOISE RATIO OF A MULTIPLE LAYER OPTICAL DISK WITH MODULATED BEAM

[75] Inventors: Philippe Refregier, Palaiseau; Brigitte Loiseaux, Villebon sur Yvette; Jean-Pierre Huignard, Paris, all of France

[73] Assignee: Thomson-CSF, Puteaux, France

[21] Appl. No.: 875,024

[22] Filed: Apr. 28, 1992

[30] Foreign Application Priority Data

May 7, 1991 [FR] France ................................ 91 05605

[51] Int. Cl.[5] ................................ G11B 7/00

[52] U.S. Cl. ................................ 369/100; 369/94; 369/107; 369/284

[58] Field of Search ................. 369/100, 107, 94, 285, 369/285, 275.3, 44.14

[56] References Cited

U.S. PATENT DOCUMENTS

| | | | |
|---|---|---|---|
| 4,090,031 | 5/1978 | Russell | 369/284 |
| 4,122,551 | 10/1978 | Urbach | 369/119 |
| 4,235,531 | 11/1980 | McMormick | 369/107 |
| 4,290,122 | 9/1981 | Bates et al. | 369/100 |
| 4,330,883 | 5/1982 | Ohta et al. | 369/100 |
| 4,460,989 | 7/1984 | Russell | 369/45 |
| 4,480,325 | 10/1984 | Aiki et al. | 369/107 |
| 4,530,080 | 7/1985 | Aoi et al. | 369/45 |
| 4,549,288 | 10/1985 | Chan | 369/107 |
| 4,637,008 | 1/1987 | Eden | 369/100 |
| 4,908,813 | 3/1990 | Ojima et al. | 369/94 |
| 5,117,416 | 5/1992 | Miyadera et al. | 369/284 |
| 5,121,376 | 6/1992 | Kuder et al. | 369/100 |

FOREIGN PATENT DOCUMENTS

| | | |
|---|---|---|
| 0011990 | 6/1980 | European Pat. Off. . |
| 3093045 | 4/1991 | Japan . |

*Primary Examiner*—Paul M. Dzierzynski
*Assistant Examiner*—Kim-Kwok Chu
*Attorney, Agent, or Firm*—Oblon, Spivak, McClelland, Maier & Neustadt

[57] ABSTRACT

The invention relates to the reading of optical disks in which the recording is performed in volume in separate layers. Reading a bit recorded within the layers gives a signal with a background noise from all the adjacent bits illuminated by the read beam. In order to eliminate this background noise, the read beam is modulated in position about the bit to be read, either horizontally or vertically with respect to a recording level. The background noise remains unchanged but the signal from the bit being read becomes a periodic signal.

6 Claims, 1 Drawing Sheet

SIGNAL TO NOISE RATIO OF A MULTIPLE LAYER OPTICAL DISK WITH MODULATED BEAM

BACKGROUND OF THE INVENTION

The present invention relates to a method for reading data recorded in a high-density optical memory including several levels of data. One of the objects of the present invention is to increase the signal-to-noise ratio in order to reduce the read error rate.

A system which allows a very high storage capacity in a digital optical disk is disclosed in the French patent application No. 90 07284 filed on Jun. 12, 1990 by the present applicant and entitled "Stockage optique d'informations en strates superposées" (Optical storage of data in superposed layers). In this system, in order to increase the number of recorded data with respect to conventional optical memories, the data are coded as bits, in the form of a local change in the index of refraction or a local change of the absorption rate—which in itself is known—but on several levels in the volume of the optical disk made of a transparent material, and no longer only on the surface as this is known. This is consequently a three-dimensional recording system made up of several planes within the thickness of the disk.

Reading the data stored on several levels is performed by optical means, by diffraction or absorption of a light beam, and the requirement for a short depth of field to read a single level at a time, implies that the aperture of the light beam be wide and, as a result, the light beam also scans data contained in planes higher and lower than that being read. The parasitic bits, even though they have a low diffraction, cause a significant background noise and a poor signal-to-noise ratio.

This is the disadvantage the present invention is intended to remedy. The proposed solution consists in modulating the position of the focusing point of the read beam and in performing a detection at the modulation frequency. The position modulation can be parallel to the read plane, or perpendicular: in both instances, only the bit adjacent to the focusing point of the read beam—thus the useful bit for the read operation—has its diffracted power changed in a significant manner, while parasitic bits produce the same overall background power. Scanning the position of the useful bit results in the recovered signal to be a periodic signal.

SUMMARY OF THE INVENTION

More specifically, the present invention relates to a method for reading data contained in an optical disk made of a transparent material, in the form of bits which are read by means of a light beam focused on the level of the bits to be read, said method being characterized in that the beam is modulated in position about the position of each bit to be read.

BRIEF DESCRIPTION OF THE DRAWINGS

The present invention will be better understood from the following detailed description of a preferred embodiment given as a non-limitative example with reference to the accompanying drawings, in which.

DESCRIPTION OF THE PREFERRED EMBODIMENT

The reading method according to the present invention may be applied to two—dimensional memory—i.e., not only to any currently known optical disk in which writing takes place only on the surface of the disk, but also to the three-dimensional memories disclosed in the abovementioned French patent application. It is in the latter case that the novel reading method is the most interesting. It can equally be applied to the case of writing by change in the refractive index or by change in the absorption of light, and to the cases of reflection, diffraction or transmission writing. For the sake of clarity and shortness, the invention will be described for the case of a three-dimensional recording change in the index of refraction, with reading by change in diffraction.

Figure 1:
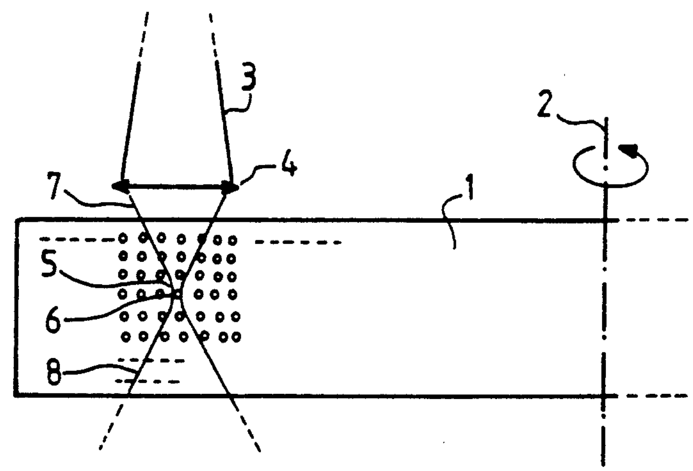
FIG. 1 is a sectional view of an optical memory disk in which writing takes place in the volume of the recording medium; this is the type of memory to which the reading method of the invention is applied.

FIG. 1 shows a cross section of the half of an optical disk 1 having a rotational motion about its axis 2. A considerable number of data—several billions—have been written in it, in several layers, in the direction of the thickness of the disk in the form of bits, i.e., small domains within which the index of refraction changes with respect to that of the binder, which is a photopolymer-type material. During writing of a bit, by means of a laser, the local index change can reach $10^{-2}$ in relative value.

Reading is performed by means of an optical beam 3 focused on the bit to be read, on the read level, by a lens 4. It will be assumed that the write levels are spaced by 10 micrometers, or microns, from one another and that the level being read is one of the inner levels in the volume of the optical disk. The requirement of having a small focusing point 5, that is a very small depth of field, implies a wide aperture of the beam.

As a consequence, the read optical beam which has to read a bit marked 6 illuminates in its converging portion 7—before the focusing point 5—a great number of bits which cause, through parasitic diffraction, a significant background noise, the more significant as the recording is a high-density recording.

The signal-to-noise ratio becomes increasingly poor with the increase in the number of recorded bits, which is a direct consequence of the diffraction of light on the bits in the planes located above and under that in which the reading takes place.

The solution proposed by the present invention consists in modulating the position of the focusing point, i.e., in scanning the read region and in performing a detection at the modulation frequency. The number of parasitic bits changes little during this local scanning, and the background noise remains substantially constant because the diffracted power remains substantially constant. On the other hand, for the bit being read, the diffracted power changes from a maximum—when the focusing point is exactly on the bit—to almost zero—when the modulated focusing point is beside the bit. This significant change translates into a repetitive signal at the modulation frequency, whose recovery from a background noise is well known.

A few figures will allow to indicate possible orders of magnitude. With the current optical disks, the aperture of the light beam is of about 60° and the radius of the focusing point 5 is of about $1/\pi \times 10^{-6}$ m: for a thickness of 1 mm in the optical disk and with recording planes spaced by 10 microns, the number of parasitic bits is $N=10^4$.

A suitable value for a read rate compatible with the applications requiring significant recording capacities—such as high-definition television (HDTV), is between 20 and 200 Mbit/s. If, for example, 100 tracks are read in parallel, each track is read at a rate between 0.2 and 2 Mbits/s. For the power gain of the signal-to-noise ratio to be of 100, the modulation frequency must be between 20 and 200 MHz.

Figure 2:
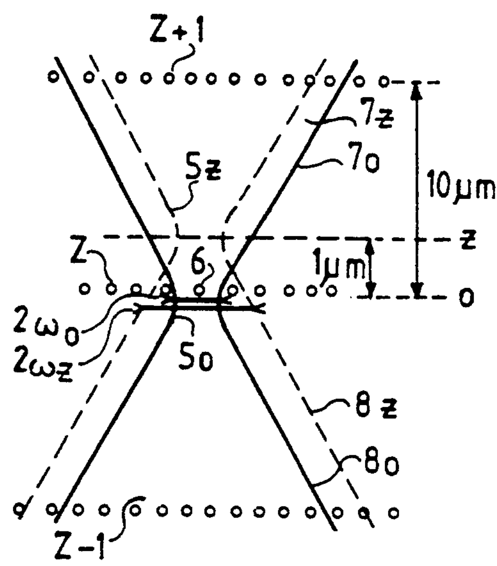
FIG. 2 is a schematic diagram of the reading method according to the invention.

Referring to FIG. 2, an enlarged view of the read region of a bit 6 is shown and will allow to better understand the phenomenon.

At the micron scale being considered, the light beam 7-8 is not rectilinear and has the shape of a Gaussian curve: what is called the focusing point is in fact a shrinked section, often referred to as the "waist".

In this Figure, three bit levels, identified by $Z-1$, $Z$ and $Z+1$, are shown. The central level Z is that which contains the bit 6 to be read, and it is spaced by about 10 microns from each of the levels $Z-1$ and $Z+1$.

The solid lines represent the read beam $7_o+8_o$ in its so-called "normal" position, i.e., without modulation. The bit 6 to be read, located at the origin level 0, is perfectly marked by the waist $5_o$ whose diameter is $2\omega_o$: the refraction of the bit 6 is maximum.

The dotted lines represent the read beam $7_z+8_z$ in a position of "vertical" modulation with a deviation z. It is assumed that a vertical modulation is a modulation along an axis perpendicular to the plane of the bit to be read, above or under this plane. The waist is at the position $5_z$, in the plane of ordinate z, and the read beam $7_z+8_z$ is no longer focused on the bit 6 to be read, and the latter is now only a point with respect to the cross section, of diameter $2\omega_z$, of the beam in the read plane 2. For the above mentioned figures and for a focal length of the lens 4 $f=1$ cm, we find that a vertical modulation $z=1$ micron yields:

$$\omega_z=2\omega_o.$$

If the read optics 4 is a spherical lens, when reading point by point, or bit by bit, the power diffracted by the bit 6 is four times lower in a modulated position ($2\omega_z$) than in the normal position ($2\omega_o$).

If the read optics 4 is a cylindrical lens disposed along a radius of the disk 1, when reading line by line, the power diffracted by the bit 6 is twice lower in a modulated position than in the normal position.

On the other hand, for the plane $Z+1$ just above the read plane (or $Z-1$ just under the read plane), spaced by 10 microns, the relative change in the read beam for a 1-micron modulation is:

$$\Delta\omega_z/\omega_z=0.1.$$

There is thus a modulation by 0.01 for a point-to-point reading, or 0.1 for a line-by-line reading, which becomes rapidly negligible for the upper or lower planes $Z+2$, $Z+3$, . . . , $Z+n$.

As a matter of fact, it may be assumed that, when there is a vertical modulation, the number of parasitic bits acquired through the increase in diameter of the beam $8_z$ at the level $L-1$ in FIG. 2 is substantially balanced by the number of parasitic bits lost due to the decrease in diameter of the beam $7_z$ at the level $Z+1$ or conversely: the background noise remains approximately constant.

This vertical modulation has the advantage of not scanning horizontally the data level being read, and is then compatible with a higher recording density, by levels.

For an optics 4 with a focal length of 1 cm, that is $10^{-2}$ m, a 1-micron modulation, that is $10^{-6}$ m, corresponds to a relative modulation of $10^{-4}$.

Figure 3:
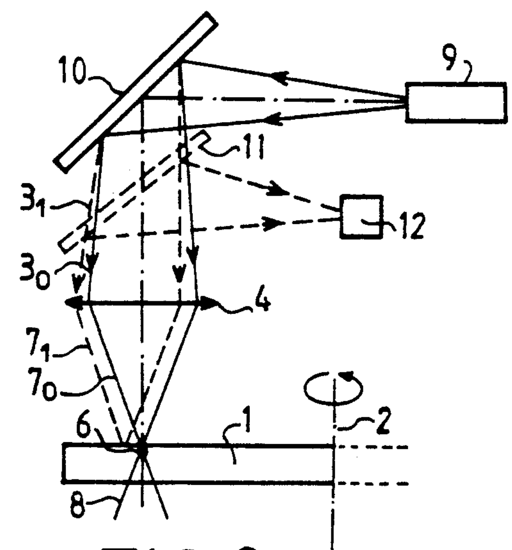
FIG. 3 is a simplified schematic-diagram of the read beam modulation method of the invention.

FIG. 2 illustrates the example of a vertical modulation; it is easy to imagine the same Figure for a horizontal modulation, in which the waist 5 is modulated in the level L on either side of the bit 6 to be read. In this case, the power diffracted by the bits of the upper and lower planes is statistically unchanged, the number of parasitic bits remains constant during scanning—while the power of the bit 6 varies from a maximum to zero. FIG. 3 shows the case of horizontal modulation.

The position of the waist 5, to scan the read region, may be modulated by several methods, the most flexible of which consist in modulating the wavelength of the read laser.

For example, for the horizontal modulation, FIG. 3 shows a laser 9 that transmits a beam which is diffracted on a grating or a hologram 10. The diffracted beam 3 is focused by an optics 4 on the bit 6 to be read on a read level Z of the optical disk 1. A change in the wavelength of the laser 9 causes a change in direction of the focusing point after diffraction on the grating 10: to a frequency $f_o$ corresponds a beam $3_o+7_o$ focused on the bit 6, and to a frequency $f_1$ corresponds a beam $3_1+7_1$ focused beside the bit 6. A horizontal modulation has thus been achieved.

The vertical modulation can be obtained with a similar method and FIG. 3 remains valid in its principle, except that 10 is a normal mirror and that a holographic lens 4 is used. With such a lens, the focal length is proportional to the wavelength of the laser 9. Varying this wavelength, by a relative amount on the order of $10^{-4}$, produces a vertical modulation of the read beam about the bit 6.

The present invention relates to an optical reading system and, up to now, only lasers have been considered, which lasers are transmitters and not sensors. In fact, the reading proper of a diffracted or transmitted optical beam belongs to the prior art and can be performed, for example, by means of a semitransparent mirror 11 which directs the light to a photodiode 12.

Figure 4:
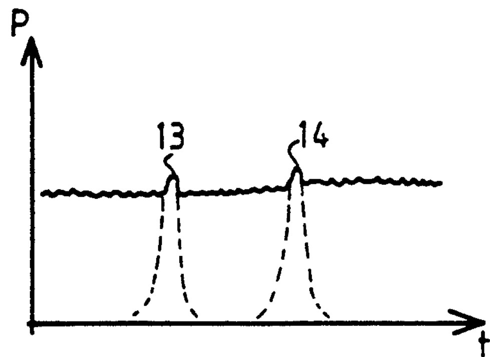
FIGS. 4 and 5 are comparative curves for the power obtained when reading, with and without modulation of the read beam.
Figure 5:
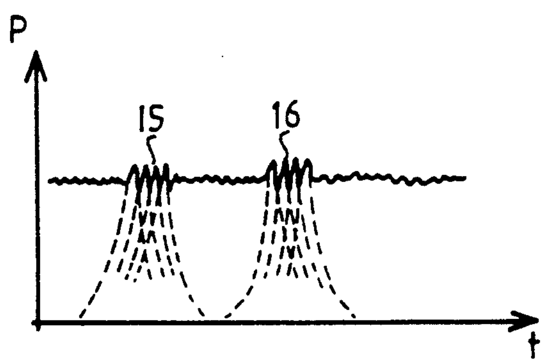

FIGS. 4 and 5 are comparisons between the signal waveforms at the output of the reader 12 without modulation of the read beam 7, and with a modulation according to the present invention. The diffracted power P is given as a function of time t. Without modulation, it is difficult to recover without error the signals from the two bits 13 and 14 shown as an example in FIG. 4, because the background noise is significant. With a modulation, as shown in FIG. 5, even if the background noise has the same amplitude, it remains random, while the signals 15 and 16 from the same two bits have become periodic signals, of sinusoidal type, which have the frequency of the modulation and whose recovery is much easier than in the previous case: reading is performed at the modulation frequency.

The present invention is essentially applicable to reading in optical disk memories using disks with a layered structure, for example for high-definition television (HDTV).

What is claimed is:

1. A method for reading data contained in an optical disk made of a transparent material wherein said data is in the form of bits and wherein said data is recorded in the optical disk at a plurality of levels layered in the volume of the disk in the direction of a thickness of said disk, said method comprising the steps of:

focusing a light beam respectively on each one of said bits of said data to be read at respectively each one of said plurality of levels; and modulating a position of a focusing point of said beam about a position of said each respective bit thereby performing reading of said each respective bit at the frequency of said modulating.

2. A method according to claim 1, wherein said data are recorded in the optical disk in the form of domains with a change in the index of refraction or a change in volume absorption.

3. A method according to claim 1, wherein the modulation of the read beam is a scanning parallel to the plane of a level of data about the position of each bit to be read.

4. A method according to claim 1, wherein the modulation of the read beam is a scanning perpendicular to the plane of a level of data, about the position of each bit to be read.

5. A method according to claim 1, wherein the modulation of the position of the read beam is obtained through a modulation of the wavelength of the light used for reading.

6. A method according to claim 1, wherein said modulation of the position of the beam about each bit to be read provides a periodic read signal in an aperiodic background noise.

* * * * *